United States Patent
Usui et al.

(10) Patent No.: US 12,473,421 B2
(45) Date of Patent: Nov. 18, 2025

(54) ETHYLENE-VINYL ALCOHOL COPOLYMER COMPOSITION, PELLETS, AND MULTILAYER STRUCTURE

(71) Applicant: Mitsubishi Chemical Corporation, Tokyo (JP)

(72) Inventors: Shintaro Usui, Tokyo (JP); Daichi Nishimura, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/713,624

(22) Filed: Dec. 13, 2019

(65) Prior Publication Data

US 2020/0115522 A1 Apr. 16, 2020

Related U.S. Application Data

(63) Continuation of application No. PCT/JP2018/024308, filed on Jun. 27, 2018.

(30) Foreign Application Priority Data

Jun. 27, 2017 (JP) .................. 2017-124968

(51) Int. Cl.
| | | |
|---|---|---|
| C08K 3/32 | (2006.01) | |
| B29B 9/12 | (2006.01) | |
| B29K 23/00 | (2006.01) | |
| B29K 105/00 | (2006.01) | |
| B32B 7/12 | (2006.01) | |
| B32B 27/08 | (2006.01) | |
| B32B 27/30 | (2006.01) | |
| C08K 5/09 | (2006.01) | |

(52) U.S. Cl.
CPC .................. *C08K 3/32* (2013.01); *B29B 9/12* (2013.01); *B32B 7/12* (2013.01); *B32B 27/08* (2013.01); *B32B 27/306* (2013.01); *C08K 5/09* (2013.01); *B29K 2023/086* (2013.01); *B29K 2105/0044* (2013.01); *C08K 2003/328* (2013.01)

(58) Field of Classification Search
CPC ...... C08K 3/32; C08K 5/09; C08K 2003/328; C08K 5/1535; C08K 13/02; C08K 5/01; C08K 3/11; B29B 9/12; B32B 7/12; B32B 27/08; B32B 27/306; B29K 2023/086; B29K 2105/0044

See application file for complete search history.

(56) References Cited

U.S. PATENT DOCUMENTS

| | | | | |
|---|---|---|---|---|
| 6,759,107 B1 * | 7/2004 | Tai | ........................... | C08L 77/00 428/407 |
| 2002/0055572 A1 | 5/2002 | Tai et al. | | |
| 2003/0018114 A1 * | 1/2003 | Tai | ........................ | C08L 29/04 524/413 |
| 2007/0243351 A1 * | 10/2007 | Tai | ........................ | C08L 29/04 428/35.8 |
| 2013/0040157 A1 * | 2/2013 | Igarashi | .................. | B32B 27/20 524/400 |
| 2013/0065001 A1 | 3/2013 | Kani | | |
| 2015/0041462 A1 | 2/2015 | Nakazawa et al. | | |
| 2015/0105508 A1 | 4/2015 | Nakazawa et al. | | |
| 2016/0215116 A1 | 7/2016 | Kani | | |
| 2016/0229987 A1 | 8/2016 | Kawai et al. | | |
| 2018/0208750 A1 | 7/2018 | Komuro et al. | | |
| 2018/0355163 A1 | 12/2018 | Sato et al. | | |
| 2019/0002612 A1 | 1/2019 | Nishimura et al. | | |
| 2019/0010305 A1 | 1/2019 | Nishimura et al. | | |

FOREIGN PATENT DOCUMENTS

| | | | | | |
|---|---|---|---|---|---|
| CN | 1280148 | A | | 1/2001 | |
| CN | 1340560 | A | | 3/2002 | |
| CN | 1392889 | A | | 1/2003 | |
| CN | 104220518 | A | | 12/2014 | |
| CN | 105612211 | A | | 5/2016 | |
| EP | 2112201 | A1 | | 10/2009 | |
| EP | 2832787 | A1 | | 2/2016 | |
| JP | 07-330994 | | | 12/1995 | |
| JP | 09-077948 | | | 3/1997 | |
| JP | 2005-082226 | A | | 3/2005 | |
| JP | 2008-230112 | | | 10/2008 | |
| JP | 2014-237860 | A | | 12/2014 | |
| JP | 2015071711 | A | * | 4/2015 | ............. B32B 27/08 |
| TW | 201343685 | A | | 11/2013 | |
| WO | 2012/005288 | A1 | | 1/2012 | |
| WO | 2013/146533 | | | 10/2013 | |
| WO | 2013/146961 | | | 10/2013 | |

(Continued)

OTHER PUBLICATIONS

Machine English translation of JP-2015071711-A (Year: 2015).*
European Search Report issued in EP Patent Application No. 18823306.8, mailing date: Jun. 5, 2020.
ISR issued in WIPO Patent App. No. PCT/JP2016/089122, dated Feb. 7, 2017, English translation.

(Continued)

*Primary Examiner* — Jessica M Roswell

(74) *Attorney, Agent, or Firm* — GREENBLUM & BERNSTEIN, P.L.C.

(57) ABSTRACT

An ethylene-vinyl alcohol copolymer composition contains: (A) an ethylene-vinyl alcohol copolymer; (B) a compound containing a conjugated polyene structure; and (C) an iron compound; wherein the iron compound (C) is present in an amount of 0.01 to 20 ppm on a metal basis based on the weight of the ethylene-vinyl alcohol copolymer composition. The ethylene-vinyl alcohol copolymer composition is less susceptible to coloration and is excellent in heat stability.

6 Claims, No Drawings

(56) References Cited

FOREIGN PATENT DOCUMENTS

| WO | 2013/146962 | 10/2013 |
|---|---|---|
| WO | 2015/041258 | 3/2015 |
| WO | 2016-199827 A1 | 12/2016 |
| WO | 2017/115847 | 7/2017 |
| WO | 2017/115848 | 7/2017 |
| WO | 2017/115849 | 7/2017 |

OTHER PUBLICATIONS

IPRP issued in WIPO Patent App. No. PCT/JP2016/089122, dated Jul. 3, 2018, English translation.
ISR issued in WIPO Patent Application No. PCT/JP2018/024308, dated Oct. 2, 2018, English translation.
IPRP issued in WIPO Patent Application No. PCT/JP2018/024308, dated Dec. 31, 2019, English translation.
Official Communication issued in Singapore Patent Application No. 11201804720P, dated Dec. 28, 2016.
Singaporean Office Action issued in SG Patent Application No. 11201912075T, mailing date: Nov. 9, 2020.
Office Action issued in CN Patent Application No. 201880040482.X, Sep. 28, 2021, English translation.
Office Action issued in TW Patent Application No. 107122176, Oct. 25, 2021, English translation.
Office Action issued in Japanese Patent Application No. 2018-534189, Jun. 29, 2021, English translation.
Patent Search Report attached to Notice of Allowance issued in Chinese Patent Application No. 201880040482.X dated Aug. 25, 2022 along with English translation thereof.
Bei et al., "Progresses in Synthesis of Ethylene-Vinyl Alcohol" Petrochemical Technology, vol. 42, No. 12, 2013, p. 1405-1410, along with English translation thereof.
Office Action issued in corresponding Taiwanese Patent Application No. 107122176 dated Sep. 12, 2022, along with English translation thereof.
Office Action issued in Singaporean Patent Application No. 11201912075T, Sep. 5, 2022.
Office Action issued in counterpart Taiwanese Patent Application No. 107122176 dated Feb. 8, 2023, along with English translation thereof.

* cited by examiner

ETHYLENE-VINYL ALCOHOL COPOLYMER COMPOSITION, PELLETS, AND MULTILAYER STRUCTURE

RELATED APPLICATION

This application is a continuation of International Application No. PCT/JP2018/024308, filed on Jun. 27, 2018, which claims priority to Japanese Patent Application No. 2017-124968, filed on Jun. 27, 2017, the entire contents of each of which being hereby incorporated by reference.

TECHNICAL FIELD

The present disclosure relates to an ethylene-vinyl alcohol copolymer composition containing an ethylene-vinyl alcohol copolymer (hereinafter referred to as "EVOH resin") as a major component, pellets formed from the EVOH resin composition, and a multilayer structure. More specifically, the present disclosure relates to an EVOH resin composition less susceptible to heat coloration and excellent in heat stability, pellets formed from the EVOH resin composition, and a multilayer structure including a layer formed from the EVOH resin composition.

BACKGROUND ART

The EVOH resin is excellent in transparency, gas barrier properties such as oxygen barrier property, aroma retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials.

However, the EVOH resin contains relatively active hydroxyl groups in its molecule and, therefore, is liable to be thermally degraded. Accordingly, the EVOH resin is susceptible to coloration during melt forming.

On the other hand, a known resin composition which can suppress fisheyes, gelation, streaks, and other defects during the melt forming, and can be formed into products such as containers and films excellent in appearance contains: (A) an EVOH resin; and (B) an unsaturated aldehyde; wherein the unsaturated aldehyde (B) is present in an amount of not less than 0.01 ppm and not greater than 100 ppm based on the amount of the resin composition (see, for example, PTL 1). Where the resin composition further contains a conjugated polyene compound, oxidative degradation of the resin composition can be suppressed during the melt forming.

PTL 1 states that the resin composition can suppress coloration, fisheyes, and other defects, and improve the appearance of the formed products, and is excellent in long-run property.

RELATED ART DOCUMENT

Patent Document

PTL 1: WO2013/146961

SUMMARY

However, an aldehyde compound such as the unsaturated aldehyde is liable to cause bad odor even if being contained in a very small amount in the resin composition. Particularly, when the resin composition is exposed to a high temperature in a forming process, the aldehyde compound is vaporized to thereby impair the working environment. This makes it difficult to use the aldehyde compound. Therefore, there is a demand for an EVOH resin composition which is less susceptible to thermal degradation during heating and can be formed into a high-quality product.

In view of the foregoing, the inventors conducted intensive studies and, as a result, found that, where a very small amount of an iron compound and a compound containing a conjugated polyene structure are used in combination, the aforementioned problems can be solved. The conjugated polyene structure-containing compound is conventionally known as a heat stabilizer for the EVOH resin, but it is unknown that the heat stability of the EVOH resin is improved by using a very small amount of the iron compound and the conjugated polyene structure-containing compound in combination. In the present disclosure, it is unexpectedly found that, where a specific very small amount of the iron compound and the conjugated polyene structure-containing compound are used in combination, the EVOH resin composition is improved in heat stability and, hence, is imparted with excellent long-run formability.

According to a first aspect of the present disclosure, there is provided an EVOH resin composition containing: (A) an EVOH resin; (B) a compound containing a conjugated polyene structure; and (C) an iron compound; wherein the iron compound (C) is present in an amount of 0.01 to 20 ppm on a metal basis based on the weight of the EVOH resin composition. According to a second aspect of the present disclosure, pellets formed from the EVOH resin composition are provided. According to a third aspect of the present disclosure, a multilayer structure including a layer formed from the EVOH resin composition is provided.

The EVOH resin composition of the present disclosure contains the EVOH resin (A), the conjugated polyene structure-containing compound (B), and the iron compound (C). In the EVOH resin composition, the iron compound (C) is present in an amount of 0.01 to 20 ppm on a metal basis based on the weight of the EVOH resin composition. The EVOH resin composition is less susceptible to the heat coloration, and is excellent in heat stability.

Where the conjugated polyene structure-containing compound (B) is present in an amount of 1 to 30,000 ppm based on the weight of the EVOH resin composition, the EVOH resin composition is less susceptible to the heat coloration, and is superior in heat stability.

Where the weight ratio of the amount of the conjugated polyene structure-containing compound (B) to the amount of the iron compound (C) on a metal basis is (conjugated polyene structure-containing compound (B))/(iron compound (C))=0.2 to 50,000, the EVOH resin composition is still less susceptible to the heat coloration, and is still superior in heat stability.

The pellets formed from the EVOH resin composition of the present disclosure are less susceptible to the heat coloration. Therefore, the pellets can be advantageously used for various forming materials, for example, for packaging materials for foods, chemicals, agricultural chemicals, and the like The multilayer structure including the layer formed from the EVOH resin composition of the present disclosure has a higher quality. Therefore, the multilayer structure is particularly useful for packaging materials, for example, for foods, chemicals, agricultural chemicals, and the like.

DESCRIPTION OF EMBODIMENTS

Preferred embodiments of the present disclosure will hereinafter be described in detail. It should be understood that these preferred embodiments are illustrative but not limitative.

<EVOH Resin Composition>

An EVOH resin composition of the present disclosure contains: (A) an EVOH resin as a major component; (B) a compound containing a conjugated polyene structure; and (C) an iron compound. The EVOH resin composition of the present disclosure contains the EVOH resin (A) as a base resin. In the EVOH resin composition, the proportion of the EVOH resin (A) is typically not less than 70 wt. %, preferably not less than 80 wt. %, more preferably not less than 90 wt. %, particularly preferably not less than 95 wt. %. The respective components will hereinafter be described in turn.

[EVOH Resin (A)]

The EVOH resin (A) to be used in the present disclosure is a water-insoluble thermoplastic resin typically prepared by saponifying a copolymer of ethylene and a vinyl ester monomer, i.e., an ethylene-vinyl ester copolymer. Vinyl acetate is generally used as the vinyl ester monomer for economy.

A known polymerization method such as solution polymerization method, suspension polymerization method or emulsion polymerization method may be utilized for copolymerization of ethylene and the vinyl ester monomer. In general, a solution polymerization method using methanol as a solvent is utilized. The saponification of the resulting ethylene-vinyl ester copolymer may be achieved by a known method.

The EVOH resin (A) thus prepared mainly contains an ethylene structural unit and a vinyl alcohol structural unit, and further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The ethylene structural unit content of the EVOH resin (A) can be controlled by adjusting the pressure of ethylene to be supplied when the vinyl ester monomer and ethylene are copolymerized. The ethylene structural unit content of the EVOH resin (A) is typically 20 to 60 mol %, preferably 25 to 50 mol %, particularly preferably 25 to 35 mol %. If the ethylene structural unit content is excessively low, the high-humidity gas barrier property and the melt formability tend to be deteriorated. If the ethylene structural unit content is excessively high, on the other hand, the gas barrier property tends to be deteriorated. The ethylene structural unit content may be measured in conformity with ISO14663.

The vinyl ester saponification degree of the EVOH resin (A) can be controlled by adjusting the amount of a saponification catalyst (typically, an alkaline catalyst such as sodium hydroxide), a saponification temperature, a saponification period, and the like for the saponification of the ethylene-vinyl ester copolymer. The saponification degree is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated. The saponification degree of the EVOH resin (A) may be measured in conformity with JIS K6726 (with the use of a solution obtained by homogenously dissolving the EVOH resin in a water/methanol solvent).

The EVOH resin (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH resin (A) is excessively high, the film formability tends to be unstable. If the MFR of the EVOH resin (A) is excessively low, the EVOH resin composition tends to have an excessively high viscosity, making melt extrusion difficult. The MFR, which is an index of the polymerization degree of the EVOH resin, can be controlled by adjusting the amount of a polymerization initiator and the amount of the solvent in the copolymerization of ethylene and the vinyl ester monomer.

The EVOH resin (A) to be used in the present disclosure may further contain a structural unit derived from any of the following comonomers in an amount (e.g., not greater than 20 mol % of the EVOH resin (A)) that does not impair the effects of the present disclosure.

The comonomers include: olefins such as propylene, 1-butene, and isobutene, hydroxyl-containing α-olefins such as 3-buten-1-ol, 3-butene-1,2-diol, 4-penten-1-ol, and 5-hexene-1,2-diol, and derivatives including esterification products and acylation products of these hydroxyl-containing α-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1- to C18-alkyl group; acrylamide compounds such as acrylamide, N-alkylacrylamides each including a C1- to C18-alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1- to C18-alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1- to C18-alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH resin having a primary hydroxyl group in its side chain is particularly preferred because it is possible to improve the secondary formability while ensuring the gas barrier property. Particularly, an EVOH resin prepared by copolymerization with the hydroxyl-containing α-olefin is preferred, and an EVOH resin having a 1,2-diol structure in its side chain is especially preferred. Particularly, where the EVOH resin having a primary hydroxyl group in its side chain is used, the content of the primary hydroxyl group is typically 0.1 to 20 mol %, preferably 0.5 to 15 mol %, particularly preferably 1 to 10 mol %.

The EVOH resin (A) to be used in the present disclosure may be a post-modified EVOH resin such as a urethanized, acetalized, cyanoethylated or oxyalkylenated EVOH resin.

The EVOH resin (A) to be used in the present disclosure may be a mixture of different EVOH resins. These EVOH resins may have different ethylene structural unit contents, different saponification degrees, and different polymerization degrees, and contain different comonomer components. Particularly, two or more types of EVOH resins having different ethylene structural unit contents are preferably used.

[Conjugated Polyene Structure-Containing Compound (B)]

The conjugated polyene structure-containing compound (B) to be used in the present disclosure is a compound containing so-called conjugated double bonds, i.e., having a structure such that carbon-carbon double bonds and carbon-carbon single bonds are alternately connected to each other and the number of the carbon-carbon double bonds is two or more. The conjugated polyene structure-containing compound (B) may be a conjugated diene compound having a structure such that two carbon-carbon double bonds and one carbon-carbon single bond are alternately connected to each other, a conjugated triene compound having a structure such that three carbon-carbon double bonds and two carbon-carbon single bonds are alternately connected to each other, or a conjugated polyene compound having a structure such that more than three carbon-carbon double bonds and more than two carbon-carbon single bonds are alternately connected to each other. However, the conjugated polyene structure-containing compound (B) excludes aromatic carboxylic acid compounds such as cinnamic acid compounds, and quinone compounds such as hydroquinone and benzoquinone.

Further, a conjugated polyene compound having eight or more conjugated carbon-carbon double bonds has its color, so that a product formed from an EVOH resin composition containing such a conjugated polyene compound is liable to be colored. Therefore, a compound containing a polyene structure having seven or less conjugated carbon-carbon double bonds is preferred. Further, the conjugated polyene structure-containing compound (B) may have a structure such that plural sets of conjugated double bonds each including two or more carbon-carbon double bonds are present in an unconjugated state in its molecule. A compound containing three conjugated trienes in its molecule (e.g., tung oil) is also an example of the conjugated polyene structure-containing compound (B).

Examples of the conjugated polyene structure-containing compound (B) include: isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, and cembrene; conjugated diene compounds each having a conjugated structure containing two carbon-carbon double bonds, e.g., sorbic acid compounds such as sorbic acid, sorbic acid esters, and sorbic acid salts, and abietic acid; conjugated triene compounds each having a conjugated structure containing three carbon-carbon double bonds, e.g., 1,3,5-hexatriene, 2,4,6-octatriene-1-carboxylic acid, eleostearic acid, tung oil, and cholecalciferol; and conjugated polyene structure-containing compounds each having a conjugated structure containing four or more carbon-carbon double bonds, e.g., cyclooctatetraene, 2,4,6,8-decatetraene-1-carboxylic acid, retinol, and retinoic acid. Of these, 1,3-pentadiene, myrcene, and farnesene each have a plurality of stereoisomers, which are all usable. Two or more of these conjugated polyene structure-containing compounds may be used in combination as the conjugated polyene structure-containing compound (B). These may be used alone or in combination.

Of these conjugated polyene structure-containing compounds, carboxyl-containing compounds each having higher water affinity are preferred, and carboxyl-containing chain compounds are more preferred as the conjugated polyene structure-containing compound (B). Particularly, the sorbic acid compounds are preferred, and sorbic acid is especially preferred as the conjugated polyene structure-containing compound (B).

The conjugated polyene structure-containing compound (B) typically has a molecular weight of 30 to 500, preferably 50 to 400, particularly preferably 100 to 300, from the viewpoint of the productivity and the handling ease. Further, the conjugated polyene structure-containing compound (B) typically has a carbon number of 4 to 30, preferably 4 to 20, particularly preferably 4 to 10, in a molecule thereof from the viewpoint of the productivity and the handling ease.

The amount of the conjugated polyene structure-containing compound (B) contained in the EVOH resin composition of the present disclosure is typically 1 to 30,000 ppm, preferably 10 to 10,000 ppm, particularly preferably 30 to 1,000 ppm, especially preferably 50 to 500 ppm, based on the weight of the EVOH resin composition. If the amount of the conjugated polyene structure-containing compound (B) is excessively great, the productivity tends to be deteriorated. If the amount of the conjugated polyene structure-containing compound (B) is excessively small, the heat stability tends to be reduced.

The amount of the conjugated polyene structure-containing compound (B) contained in the EVOH resin composition may be measured in the following procedure, for example, by means of a liquid chromatograph/UV spectrophotometer. The following procedure is directed to the measurement of the amount of sorbic acid by way of example, but is applicable to the measurement of the amount of other conjugated polyene structure-containing compound (B) by using an extraction solvent suitable for the compound.

[Method of Measuring Amount of Conjugated Polyene Structure-Containing Compound (B)]

(1) The EVOH resin composition is freeze-pulverized, and 8 mL of an extraction solvent (having a distilled water/methanol volume ratio of 1/1) is added to 1 g of the resulting EVOH resin composition powder.

(2) The resulting solution is ultrasonically treated still at a temperature of 20° C. for 1 hour, whereby sorbic acid is extracted from the resin. The resulting solution is cooled, and then diluted with the extraction solvent to a volume of 10 mL. As required, the solution may be diluted at a desired dilution ratio.

(3) The resulting solution is filtered with a filter having a pore size of 0.45 μm, and then analyzed by a liquid chromatograph/UV spectrophotometer, whereby the amount of sorbic acid contained in the extraction solution is measured.

(4) A calibration line is prepared with the use of standard solutions of sorbic acid prepared by using the extraction solvent, and the amount of sorbic acid is determined through an absolute calibration line method.

[HPLC Measurement Conditions]
LC system: AGILENT 1260/1290 (available from Agilent Technologies, Inc.)
Detector: AGILENT 1260 infinity diode array detector (available from Agilent Technologies, Inc.)
Column: CADENZA CD-C18 (100×3.0 mm, 3 μm) (available from Imtakt Corporation)
Column temperature: 40° C.
Mobile phase A: Aqueous solution containing 0.05% formic acid and 5% acetonitrile
Mobile phase B: Aqueous solution containing 0.05% formic acid and 95% acetonitrile
Time program: 0.0 to 5.0 minutes B (%)=30%
  5.0 to 8.0 minutes B (%)=30% to 50%
  8.0 to 10.0 minutes B (%)=50%
  10.0 to 13.0 minutes B (%)=50% to 30%
  13.0 to 15.0 minutes B (%)=30%
Flow rate: 0.2 mL/minute
UV detection wavelength: 190 to 400 nm
Quantitative wavelength: 262 nm In the HPLC measurement conditions, "%" means vol. %.

[Iron Compound (C)]

The EVOH resin composition of the present disclosure contains the iron compound (C) in addition to the EVOH resin (A) and the conjugated polyene structure-containing compound (B). In the EVOH resin composition, the iron compound (C) is present in a specific very small amount. With this arrangement, the EVOH resin composition of the present disclosure is less susceptible to coloration, and is excellent in heat stability.

In general, the EVOH resin is susceptible to coloration due to thermal degradation. This is supposedly because hydroxyl groups are thermally removed from the EVOH resin to dehydrate the EVOH resin, whereby double bonds are formed in the main chain of the EVOH resin, which serves as reaction starting points to promote the dehydration to form conjugated polyene structures in the EVOH resin.

Those skilled in the art generally refrain from using the iron compound supposedly because a product formed from an EVOH resin composition containing the iron compound (C) is liable to be colored by iron ions. In the present disclosure, however, it is unexpectedly found that the EVOH resin composition less susceptible to the heat coloration can be provided by incorporating a very small amount of the iron compound (C) to the EVOH resin composition.

Iron can be present as divalent ions and trivalent ions. The effects of the present disclosure can be provided by using a very small amount of the iron compound and the conjugated polyene structure-containing compound in combination. This is supposedly because a cycle occurs in which the conjugated polyene structure-containing compound (B) frequently reduces trivalent iron ions into divalent iron ions, and is reduced again to be reactivated by the divalent iron ions.

The iron compound (C) may be present, for example, as iron oxide, iron hydroxide, iron chloride, or iron salt, in an ionized form, or in the form of a complex coordinated with the resin or other ligands in the EVOH resin composition. Examples of the iron oxide include ferric oxide, ferrosoferric oxide, and ferrous oxide. Examples of the iron chloride include ferrous chloride, and ferric chloride. Examples of the iron hydroxide include ferrous hydroxide, and ferric hydroxide. Examples of the iron salt include inorganic salts such as iron phosphate and iron sulfate, and organic salts such as iron carboxylates (e.g., iron acetate, iron butyrate, iron stearate, and the like). These may be used alone or in combination.

From the viewpoint of dispersibility in the EVOH resin composition, the iron compound (C) is preferably water-soluble. From the viewpoint of the dispersibility and the productivity, the iron compound (C) typically has a molecular weight of 100 to 10,000, preferably 100 to 1,000, particularly preferably 100 to 500.

The amount of the iron compound (C) contained in the EVOH resin composition of the present disclosure is 0.01 to 20 ppm, preferably 0.03 to 8 ppm, particularly preferably 0.05 to 3 ppm, especially preferably 0.05 to 1.5 ppm, on a metal basis based on the weight of the EVOH resin composition. If the amount of the iron compound (C) is excessively small, the coloration-suppressing effect tends to be insufficient. If the amount of the iron compound (C) is excessively great, on the other hand, the formed product tends to be colored.

The amount of the iron compound (C) is determined by ashing 0.5 g of the EVOH resin composition in an infrared heating oven (in an oxygen stream at 650° C. for 1 hour), dissolving the resulting ash in an acid, diluting the resulting solution to a predetermined volume with purified water to prepare a sample solution, and analyzing the sample solution by an ICP-MS (7500ce available from Agilent Technologies, Inc.) through a standard addition method.

In the EVOH resin composition of the present disclosure, the weight ratio of the amount of the conjugated polyene structure-containing compound (B) to the amount of the iron compound (C) on a metal basis (conjugated polyene structure-containing compound (B)/iron compound (C)) is typically 0.2 to 50,000, preferably 1 to 25,000, particularly preferably 5 to 10,000, especially preferably 50 to 5,000. If the weight ratio is excessively great, the heat stability tends to be impaired. If the weight ratio is excessively small, the formed product tends to be colored.

[Other Thermoplastic Resin]

The EVOH resin composition of the present disclosure may contain a thermoplastic resin other than the EVOH resin (A) in an amount (e.g., typically not greater than 30 wt. %, preferably not greater than 20 wt. %, particularly preferably not greater than 10 wt. %, based on the weight of the EVOH resin composition) that does not impair the effects of the present disclosure.

A known thermoplastic resin may be used as the other thermoplastic resin. Specific examples of the thermoplastic resin include polyamide resins, polyolefin resins, polyester resins, polystyrene resins, polyvinyl chloride resins, polycarbonate resins, polyacrylic resins, ionomers, ethylene-acrylic acid copolymers, ethylene-acrylate copolymers, ethylene-methacrylic acid copolymers, ethylene-methacrylate copolymers, polyvinylidene chlorides, vinyl ester resins, polyester elastomers, polyurethane elastomers, chlorinated polyethylenes, and chlorinated polypropylenes, which may be used alone or in combination.

[Other Additives]

The EVOH resin composition of the present disclosure may contain additives that are generally blended with the EVOH resin, as long as the effects of the present disclosure are not impaired. Examples of the additives include: inorganic double salt (e.g., hydrotalcites); plasticizer (e.g., aliphatic polyhydric alcohol such as ethylene glycol, glycerin or hexanediol); oxygen absorber [e.g., inorganic oxygen absorber such as aluminum powder, potassium sulfite or photo-catalytic titanium oxide; organic compound oxygen absorber such as ascorbic acid, its fatty acid ester, and its metal salt, polyhydric phenol compound (e.g., hydroquinone, gallic acid, hydroxyl-containing phenol aldehyde resin or the like), coordination compound obtained by coordination-bonding nitrogen-containing compound and non-iron transition metal (e.g., bis-salicylaldehyde-imine cobalt, tetraethylenepentamine cobalt, cobalt-Schiff base complex, porphyrins, macrocyclic polyamine complex, polyethylene-imine-cobalt complex or the like), reaction product obtained by reaction between amino acid and hydroxyl-containing reductive substance, triphenylmethyl compound or the like; or polymer oxygen absorber such as coordination compound obtained by coordination-bonding nitrogen-containing resin and non-iron transition metal (e.g., combination of methyl-xylylenediamine (MXD) nylon and cobalt), blend of tertiary hydrogen-containing resin and non-iron transition metal (e.g., combination of polypropylene and cobalt), blend of unsaturated carbon-carbon bond-containing resin and non-iron transition metal (e.g., combination of polybutadiene and cobalt), photo-oxidation degradative resin (e.g., polyketone), anthraquinone polymer (e.g., polyvinylanthraquinone), or mixture containing any of these blends and photo initiator (benzophenone or the like), peroxide scavenger (commercially available antioxidant or the like) or deodorant (active carbon or the like)]; and heat stabilizer, photo stabilizer, UV absorber, colorant, antistatic agent, surfactant (not serving as lubricant), antibacterial agent, antiblocking agent, and filler (e.g., inorganic filler or the like). These compounds may be used alone or in combination.

[EVOH Resin Composition Production Method]

Known examples of a method of producing the EVOH resin composition of the present disclosure by using the components described above include dry blending method, melt mixing method, solution mixing method, and impregnation method, which may be used in combination.

An example of the dry blending method is a method (i) including the step of dry-blending pellets of the EVOH resin (A) with the conjugated polyene structure-containing compound (B) and the iron compound (C) by means of a tumbler or the like.

Examples of the melt mixing method include: a method (ii) including the steps of melt-kneading a dry blend of pellets of the EVOH resin (A), the conjugated polyene structure-containing compound (B), and the iron compound (C), and forming the resulting melt mixture into pellets or a product; and a method (iii) including the steps of adding the conjugated polyene structure-containing compound (B) and the iron compound (C) to the EVOH resin (A) in a melted state, melt-kneading the resulting mixture, and forming the resulting melt mixture into pellets or a product.

Examples of the solution mixing method include: a method (iv) including the steps of preparing a solution by using commercially available pellets of the EVOH resin (A), adding the conjugated polyene structure-containing compound (B) and the iron compound (C) to the solution, solidifying and forming the resulting solution into pellets, separating the pellets from the solution, and drying the pellets; and a method (v) including the steps of adding the conjugated polyene structure-containing compound (B) and the iron compound (C) to an unsaponified ethylene-vinyl ester copolymer solution or a homogeneous solution (water/alcohol solution or the like) of the EVOH resin in the preparation of the EVOH resin (A), solidifying and forming the resulting solution into pellets, separating the pellets from the solution, and drying the pellets.

An example of the impregnation method is a method (vi) including the steps of bringing pellets of the EVOH resin (A) into contact with an aqueous solution containing the conjugated polyene structure-containing compound (B) and the iron compound (C) to incorporate the conjugated polyene structure-containing compound (B) and the iron compound (C) into the pellets of the EVOH resin (A), and then drying the resulting pellets.

In the present disclosure, any of the aforementioned different methods may be used in combination. Particularly, the melt mixing method is preferred, and the method (ii) is particularly preferred, because the EVOH resin composition produced by these methods is significantly improved in productivity and the effects of the present disclosure.

Pellets of the EVOH resin composition of the present disclosure to be produced by any of the aforementioned methods, and the pellets of the EVOH resin (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. The oval pellets typically each have a minor diameter of 1 to 10 mm and a major diameter of 1.5 to 30 mm, preferably a minor diameter of 2 to 6 mm and a major diameter of 3 to 20 mm, more preferably a minor diameter of 2.5 to 5.5 mm and a major diameter of 3.5 to 10 mm, for easy handling thereof in the subsequent use as a forming material. The cylindrical pellets typically each have a bottom diameter of 1 to 6 mm and a length of 1 to 6 mm, preferably a bottom diameter of 2 to 5 mm and a length of 2 to 5 mm.

As described above, a water-soluble iron compound is preferably used as the iron compound (C) in the aforementioned methods. Examples of the iron compound include: iron oxides such as ferric oxide, ferrosoferric oxide, and ferrous oxide; iron chlorides such as ferrous chloride and ferric chloride; iron hydroxides such as ferrous hydroxide and ferric hydroxide; inorganic iron salts such as iron phosphate and iron sulfate; and organic iron salts such as iron carboxylates (e.g., iron acetate, iron butyrate, iron stearate, and the like). As described above, the iron compound (C) may be present in the form of the salt, in an ionized form, or in the form of a complex coordinated with the resin or other ligands in the EVOH resin composition.

Usable as the aqueous solution containing the iron compound (C) in the method (vi) are an aqueous solution of any of the aforementioned iron compounds, and an aqueous solution which contains iron ions released from a steel material immersed in water containing chemical agents. In this case, the amount (on a metal basis) of the iron compound (C) to be contained in the EVOH resin composition can be controlled by adjusting the concentration of the iron compound (C) in the aqueous solution in which the pellets of the EVOH resin (A) are immersed, the immersion temperature, the immersion period, and/or the like. The immersion period is typically 0.5 to 48 hours, preferably 1 to 36 hours, and the immersion temperature is typically 10° C. to 40° C., preferably 20° C. to 35° C. After the immersion, the pellets of the EVOH resin composition are separated from the aqueous solution by a known method, and dried by a known drying method. Various drying methods are usable for the drying, and examples of the drying methods include stationary drying method and fluidized drying method, which may be used alone or in combination.

The pellets of the EVOH resin composition of the present disclosure typically have a water content of 0.01 to 0.5 wt. %, preferably 0.05 to 0.35 wt. %, particularly preferably 0.1 to 0.3 wt. %.

In the present disclosure, the water content of the EVOH resin composition pellets is measured and calculated by the following method.

The weight (W1) of the EVOH resin composition pellets is measured by an electronic balance before the drying, and the EVOH resin composition pellets are dried at 150° C. for 5 hours in a hot air dryer and cooled for 30 minutes in a desiccator. Then, the weight (W2) of the resulting EVOH resin composition pellets is measured. The water content of the EVOH resin composition pellets is calculated from the following expression:

Water content (wt. %)=[($W1-W2$)/$W1$]×100

The EVOH resin composition of the present disclosure is evaluated for heat stability based on a weight reduction percentage. The EVOH resin composition of the present disclosure typically has a weight reduction percentage of 0.7 to 1.1%, preferably 0.8 to 1.0%, particularly preferably 0.9%. If the weight reduction percentage value is excessively low (weight reduction is excessively small), the EVOH resin composition is hardly decomposed, and the viscosity of the EVOH resin composition tends to increase with time during the melt forming, resulting in poorer long-run formability. If the weight reduction percentage value is excessively high (weight reduction is excessively great), this means that the EVOH resin composition is excessively decomposed. Therefore, the EVOH resin composition is liable to be foamed due to gas generated by the decomposition of the EVOH resin composition. This tends to adversely influence the appearance of the formed product and the like.

For determination of the weight reduction percentage, the EVOH resin composition is pulverized to a size of 1- to 5-mm square, and 5 mg of the pulverized EVOH resin composition is heated at a temperature of 230° C. at a gas flow rate of 20 mL/minute for 1 hour in a nitrogen atmosphere by means of a thermogravimeter (PYRIS 1 TGA available from Perkin Elmer, Inc.) The weight reduction percentage is calculated from the following expression based on the weights of the EVOH resin composition measured before and after the heating:

Weight reduction percentage (%)=[($W_a-W_b$)/$W_a$]×100 wherein $W_a$ is the weight of the EVOH resin composition before the heating, and $W_b$ is the weight of the EVOH resin composition after the heating.

The EVOH resin composition pellets thus produced may be used as they are for the melt forming. In order to ensure stable feeding of the EVOH resin composition pellets in the melt forming, it is also preferred to apply a known lubricant to surfaces of the pellets. Examples of the lubricant include: higher fatty acids having a carbon number of not less than 12 (e.g., lauric acid, myristic acid, palmitic acid, stearic acid, behenic acid, and oleic acid); esters of the higher fatty acids (e.g., methyl esters, isopropyl esters, butyl esters, and octyl esters of the higher fatty acids); amides of the higher fatty acids (e.g., saturated higher fatty acid amides such as lauramide, myristamide, palmitamide, stearamide, and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide); low-molecular-weight polyolefins (e.g., low-molecular-weight polyethylenes and low-molecular-weight polypropylenes each having a molecular weight of about 500 to about 10,000, and acid modification products of these low-molecular-weight polyolefins); and higher alcohols having a carbon number of not less than 6, ester oligomers, and fluorinated ethylene resins. The amount of the lubricant present on the pellets is typically not greater than 5 wt. %, preferably not greater than 1 wt. %, based on the weight of the EVOH resin composition.

The EVOH resin composition of the present disclosure may be prepared in any of various forms, e.g., in a pellet form, in a powdery form, or in a liquid form, for use as a forming material for various formed products. Particularly, the EVOH resin composition of the present disclosure is preferably provided as a melt-formable material, because the effects of the present disclosure can be more efficiently provided. The EVOH resin composition of the present disclosure may be a resin composition prepared by mixing the EVOH resin composition with a resin other than the EVOH resin (A).

Exemplary products to be formed from the EVOH resin composition of the present disclosure for practical applications include a single-layer film formed by using the EVOH resin composition of the present disclosure, and a multilayer structure including the layer formed by using the EVOH resin composition of the present disclosure.

[Multilayer Structure]

A multilayer structure of the present disclosure includes a layer formed from the EVOH resin composition of the present disclosure. The layer formed from the EVOH resin composition of the present disclosure (hereinafter referred to as "EVOH resin composition layer") may be laminated with some other base material (hereinafter referred to as "base resin") containing a thermoplastic resin other than the EVOH resin composition of the present disclosure as a major component. Thus, the EVOH resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred.

Where EVOH resin composition layers a (a1, a2, . . . ) formed from the EVOH resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the EVOH resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layers are provided between the EVOH resin composition layer formed from the EVOH resin composition of the present disclosure and the base resin layers in the multilayer structure, the adhesive resin layers are present on opposite sides of the EVOH resin composition layer and, therefore, a highly hydrophobic adhesive resin is preferably used for the adhesive resin layers.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., in amounts of not greater than 30 wt. %, preferably not greater than 10 wt. % of the resin). These may be used alone or in combination.

The EVOH resin composition layer formed by using the EVOH resin composition of the present disclosure and the base resin layer may be laminated together (optionally with the adhesive resin layer provided therebetween) by a known laminating method. Examples of the laminating method include: a method in which a film or a sheet of the EVOH resin composition of the present disclosure is laminated with the base resin by melt extrusion; a method in which the base resin layer is laminated with the EVOH resin composition of the present disclosure by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat-setting process to ensure dimensional stability after the stretching. The heat-setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property, for example, by applying cold air over the stretched film without performing the above heat-setting process.

In some case, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, pharmaceutical products, and the like. The layer formed from the EVOH resin composition of the present disclosure is less susceptible to coloration and excellent in heat stability and, therefore, is particularly useful as a packaging material for foods, chemical agents, agricultural chemicals, and the like.

EXAMPLES

The embodiments of the present disclosure will hereinafter be described more specifically by way of examples thereof. However, it should be understood that the present disclosure be not limited to the examples within the scope of the present disclosure.

In the following examples, "parts" means "parts by weight" unless otherwise specified.

Prior to implementation of Examples, pellets of the following EVOH resin (A) were prepared, and the amount of an iron compound (C) contained in the EVOH resin (A) was measured.

EVOH resin (A): Ethylene-vinyl alcohol copolymer having an ethylene structural unit content of 29 mol %, a saponification degree of 99.6 mol %, and an MFR of 3.9 g/10 minutes (as measured at 210° C. with a load of 2160 g)

[Measurement of Amount of Iron Compound (C)]

A sample was prepared by pulverizing the pellets of the EVOH resin (A), and 0.5 g of the sample was ashed in an infrared heating oven (in an oxygen stream at 650° C. for 1 hour). The resulting ash was dissolved in an acid, and the resulting solution was diluted to a predetermined volume with purified water, whereby a sample solution was prepared. The sample solution was analyzed by an ICP-MS (ICP mass spectrometer 7500ce available from Agilent Technologies, Inc.) through a standard addition method. As a result, the amount of the iron compound (C) was 0 ppm on a metal basis.

Example 1

An EVOH resin composition of Example 1 was prepared by preheating a mixture of 100 parts of the pellets of the EVOH resin (A), 0.01 parts (corresponding to 100 ppm based on the weight of the EVOH resin composition) of sorbic acid (having a molecular weight of 112) as the conjugated polyene structure-containing compound (B), and 0.000034 parts (corresponding to 0.1 ppm on a metal basis based on the weight of the EVOH resin composition) of iron (III) phosphate n-hydrate (available from Wako Pure Chemical Industries, Ltd., and having a drying loss of 20.9 wt. % when being dried at 230° C.) as the iron compound (C) at 230° C. for 5 minutes, and then melt-kneading the mixture for 5 minutes by a plastograph (available from Brabender Corporation). The EVOH resin composition thus prepared was pulverized by operating a crusher (SKR16-240 available from Sometani Sangyo Co., Ltd.) at 650 rpm. The pulverized product of the EVOH resin composition was in a granular form having a size of 1- to 5-mm square.

Example 2

An EVOH resin composition of Example 2 was prepared in substantially the same manner as in Example 1, except that the amount of iron (III) phosphate n-hydrate was 0.00034 parts (corresponding to 1 ppm on a metal basis based on the weight of the EVOH resin composition).

Example 3

An EVOH resin composition of Example 3 was prepared in substantially the same manner as in Example 1, except that the amount of iron (III) phosphate n-hydrate was 0.0034 parts (corresponding to 10 ppm on a metal basis based on the weight of the EVOH resin composition).

Comparative Example 1

An EVOH resin composition of Comparative Example 1 was prepared in substantially the same manner as in Example 1, except that iron (III) phosphate n-hydrate was not blended.

The EVOH resin compositions of Examples 1 to 3, and Comparative Example 1 were each evaluated for coloration and heat stability by the following methods. The results are shown below in Table 1.

[Coloration Evaluation]

The pulverized products of the EVOH resin compositions were each heat-treated at 150° C. for 5 hours in an air atmosphere in an oven, and then the YI value of the resulting EVOH resin composition was measured by means of a spectrophotometer SE6000 available from Nippon Denshoku Industries Co., Ltd. At this time, the measurement was performed with the EVOH resin composition filled to the full in a cylinder having an inner diameter of 32 mm and a height of 30 mm. A higher YI value means that the EVOH resin composition was yellowed.

[Heat Stability Evaluation]

For heat stability evaluation, 5 mg of each of the pulverized products of the EVOH resin compositions prepared in the aforementioned manner was used. The weight reduction percentage was calculated from the following expression based on the weights of the pulverized product measured before and after the pulverized product was heated at a temperature of 230° C. at a gas flow rate of 20 mL/minute for hour in a nitrogen atmosphere by means of a thermogravimeter (PYRIS 1 TGA available from Perkin Elmer, Inc.)

Weight reduction percentage (%)=[($W_a$-$W_b$)/$W_a$]×100 wherein $W_a$ is the weight of the EVOH resin composition before the heating, and $W_b$ is the weight of the EVOH resin composition after the heating.

The weight reduction percentage thus calculated was rounded to the first decimal place. The EVOH resin composition was evaluated for heat stability based on the following evaluation criteria:

A: 0.9% (Particularly superior heat stability)
B: 0.8% or 1.0% (Superior heat stability)
C: 0.7% or 1.1% (Excellent heat stability)
D: 0.6% (Poor heat stability)
E: Less than 0.5% or not less than 1.2% (Very poor heat stability)

TABLE 1

|  | Example 1 | Example 2 | Example 3 | Comparative Example 1 |
|---|---|---|---|---|
| Amount (ppm) of conjugated polyene structure-containing compound (B) | 100 | 100 | 100 | 100 |
| Amount (ppm) of iron compound (C) on metal basis | 0.1 | 1 | 10 | 0 |
| Amount of conjugated polyene structure-containing compound (B)/Amount of iron compound (C) on metal basis | 1,000 | 100 | 10 | — |
| YI after heating | 54.4 | 53.4 | 54.1 | 58.7 |
| Heat stability evaluation | | | | |
| Weight reduction percentage (%) | 1.0 | 0.8 | 1.0 | 1.2 |
| Rating | B | B | B | E |

The EVOH resin composition of Comparative Example 1 containing the conjugated polyene structure-containing compound (B) but not containing the iron compound (C) had a higher YI value of 58.7 after the heating. In contrast, the EVOH resin compositions of Examples 1 to 3 were superior with lower YI values than that of Comparative Example 1.

The EVOH resin composition of Comparative Example 1 containing the conjugated polyene structure-containing compound (B) but not containing the iron compound (C) was insufficient in heat stability with a higher weight reduction percentage of 1.2%. In contrast, the EVOH resin compositions of Examples 1 to 3 were superior in heat stability than that of Comparative Example 1.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is less susceptible to coloration and excellent in heat stability and, therefore, is particularly useful for various packaging materials for various foods, condiments such as mayonnaise and dressing, fermented foods such as miso, fat and oil such as salad oil, beverages, cosmetics, pharmaceutical products, and the like.

The invention claimed is:

1. An ethylene-vinyl alcohol copolymer composition comprising:
   (A) an ethylene-vinyl alcohol copolymer;
   (B) a compound containing a conjugated polyene structure; and
   (C) an iron compound;
   wherein the ethylene-vinyl alcohol copolymer (A) is present in an amount that is not less than 70 wt. % based on a total weight of the ethylene-vinyl alcohol copolymer composition,
   wherein the compound containing a conjugated polyene structure has a molecular weight of 30 to 500,
   wherein the conjugated polyene structure-containing compound (B) is present in an amount of 30 to 1000 ppm based on the weight of the ethylene-vinyl alcohol copolymer composition,
   wherein the iron compound (C) is an iron salt selected from the group consisting of iron phosphates, iron sulfates, and iron carboxylates,
   wherein the iron compound (C) is present in an amount of 0.01 to 20 ppm on a metal basis based on the weight of the ethylene-vinyl alcohol copolymer composition, and
   wherein a weight ratio of the amount of the conjugated polyene structure-containing compound (B) to the amount of the iron compound (C) on a metal basis is (conjugated polyene structure-containing compound (B))/(iron compound (C))=1 to 50,000.

2. The ethylene-vinyl alcohol copolymer composition according to claim 1, wherein the weight ratio of the amount of the conjugated polyene structure-containing compound (B) to the amount of the iron compound (C) on a metal basis is (conjugated polyene structure-containing compound (B))/(iron compound (C))=1 to 25,000.

3. Pellets comprising the ethylene-vinyl alcohol copolymer composition according to claim 1.

4. A multilayer structure comprising a layer which comprises the ethylene-vinyl alcohol copolymer composition according to claim 1.

5. The ethylene-vinyl alcohol copolymer composition according to claim 1, wherein the conjugated polyene structure-containing compound (B) is present in an amount of 30 to 500 ppm based on the weight of the ethylene-vinyl alcohol copolymer composition.

6. The ethylene-vinyl alcohol copolymer composition according to claim 1, wherein the iron compound (C) comprises iron (III) phosphate n-hydrate.

* * * * *